(12) United States Patent
Hayden et al.

(10) Patent No.: US 10,364,765 B2
(45) Date of Patent: Jul. 30, 2019

(54) METHOD TO SELECT OPTIMAL MODE ON A MULTI-MODE ENGINE WITH CHARGING

(71) Applicant: GM Global Technology Operations LLC, Detroit, MI (US)

(72) Inventors: David N. Hayden, Ortonville, MI (US); Michael Deffenbaugh, Novi, MI (US); Christopher E. Whitney, Commerce, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/433,511

(22) Filed: Feb. 15, 2017

(65) Prior Publication Data

US 2018/0230927 A1    Aug. 16, 2018

(51) Int. Cl.
F02D 41/00      (2006.01)
F02D 41/14      (2006.01)

(52) U.S. Cl.
CPC ..... *F02D 41/0087* (2013.01); *F02D 41/0002* (2013.01); *F02D 41/1406* (2013.01); *F02D 2041/001* (2013.01); *F02D 2041/1412* (2013.01); *F02D 2041/1432* (2013.01); *F02D 2200/0625* (2013.01); *F02D 2250/21* (2013.01); *Y02T 10/42* (2013.01)

(58) Field of Classification Search
CPC ............... F02D 41/307; F02D 41/3017; F02D 41/0087; F02D 41/26; F02D 2200/06; F02D 2200/1002; F02D 2200/101
See application file for complete search history.

(56) References Cited

U.S. PATENT DOCUMENTS 7,614,384 B2 *  11/2009  Livshiz ................. F02D 11/105
                                                    123/399
8,473,179 B2 *  6/2013  Whitney ............. F02D 13/0207
                                                    701/102

* cited by examiner

*Primary Examiner* — Xiao En Mo

(57) ABSTRACT

A control method for selecting an optimal multiple step operating mode for a multiple cylinder motor vehicle engine system having variable lift includes prioritizing each of a full torque capacity (FTC) mode having all cylinders operating at high lift, a first reduced capacity economy mode (RCE1) having all cylinders operating at low lift, and a second reduced capacity economy mode (RCE2) having fewer than all of the cylinders operating at low lift with at least one cylinder deactivated based on predicted fuel economy of each of the modes. Multiple constraints are applied to each of the prioritized modes including incorporating boost as one of the constraints by calculating a maximum torque capacity for each mode that is a function of a current boost pressure. A mode determination arbitration is conducted to identify if a change in mode is required.

20 Claims, 4 Drawing Sheets

METHOD TO SELECT OPTIMAL MODE ON A MULTI-MODE ENGINE WITH CHARGING

INTRODUCTION

The present disclosure relates to internal combustion engines and more particularly to systems and methods to select a best operating mode for engine operation.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Engine control systems have been developed to control engine output torque to achieve a desired torque. Traditional engine control systems, however, do not control the engine output torque as accurately as desired. Further, traditional engine control systems do not provide a rapid response to control signals or coordinate engine torque control among various devices that affect the engine output torque, in particular with respect to boosted engines and engines having multiple operating modes.

Thus, while current engine control systems achieve their intended purpose, there is a need for a new and improved system and method for translating accelerator pedal travel to a desired axle or engine torque.

SUMMARY

According to several aspects, a control method for selecting an optimal multiple step operating mode for a motor vehicle engine system, includes: providing at least two variable capacity modes of operation; prioritizing the at least two variable capacity modes based on fuel efficiency; applying torque constraint data and noise and vibration (NV) constraint data to the prioritized modes; and conducting a mode determination arbitration for the prioritized modes having the torque constraint and the vibration constraint data applied to identify if a change in mode is required.

In an additional aspect of the present disclosure, the at least two variable capacity modes include a first mode defining a full torque capacity (FTC) mode having all cylinders operating at high lift, a second mode defining a first reduced capacity economy mode (RCE1) having all cylinders operating at low lift, and a third mode defining a second reduced capacity economy mode (RCE2) having fewer than all of the cylinders operating.

According to another aspect, the method includes: evaluating a first engine speed (rpm) signal and a first desired torque signal in conjunction with full torque capacity data in a first FTC lookup table; analyzing a second engine speed (rpm) signal and a second desired torque signal in conjunction with first reduced capacity economy data in a second RCE1 lookup table; and assessing a third engine speed (rpm) signal and a third desired torque signal in conjunction with second reduced capacity economy data in a third RCE2 lookup table.

According to another aspect, the method includes generating each of a predicted FTC fuel flow signal, a predicted RCE1 fuel flow signal, and a predicted RCE2 fuel flow signal.

According to another aspect, the prioritizing step includes sorting in a sorting module the predicted FTC fuel flow signal, the predicted RCE1 fuel flow signal, and the predicted RCE2 fuel flow signal between a lowest predicted fuel flow, a next or second lowest predicted fuel flow, and a highest predicted fuel flow.

According to another aspect, the method includes forwarding the lowest predicted fuel flow, the second lowest predicted fuel flow, and the highest predicted fuel flow to each of an allowable mode evaluator and an arbitration module.

According to another aspect, the method includes determining if FTC mode is allowed or not allowed, if RCE1 mode is allowed or not allowed, and if RCE2 mode is allowed or not allowed.

According to another aspect, the method includes prior to the conducting step transmitting the mode that is ranked having the lowest fuel consumption that is allowed from the allowable mode evaluator to each of an arbitration module and a mode determination module.

According to another aspect, an engine speed represented by the first engine speed (rpm) signal and an engine speed represented by second engine speed (rpm) signal are substantially the same, and the engine speed represented by the third engine speed (rpm) signal is greater than the first and the second engine speed signals due to torque converter slip.

According to another aspect, the applying step includes incorporating boost by calculating a maximum torque capacity for each mode that is a function of a current boost pressure.

According to another aspect, the at least two variable capacity modes include a first mode having a highest torque capacity with a lowest fuel efficiency, a second mode having a medium torque capacity less than the highest torque capacity and with a medium fuel efficiency higher than the lowest fuel efficiency, and a third mode having a lowest torque capacity lower than the medium torque capacity and with a highest fuel efficiency higher than the medium fuel efficiency.

According to another aspect, further including the at least two variable capacity modes include a first mode, a second mode, a third mode, and a fourth mode, wherein the first mode includes a highest lift, the second mode includes a high lift having a lift lower than the highest lift, the third mode includes a medium a lift lower than the high lift, and the fourth mode includes a low lift lower than the medium lift.

According to several aspects, a control method for selecting an optimal multiple step operating mode for a multiple cylinder motor vehicle engine system having variable lift, includes: prioritizing each of a full torque capacity (FTC) mode having all cylinders operating at high lift, a first reduced capacity economy mode (RCE1) having all cylinders operating at low lift, and a second reduced capacity economy mode (RCE2) having fewer than all of the cylinders operating at low lift with at least one cylinder deactivated based on predicted fuel economy of each of the modes; sorting the prioritized modes between mode having a lowest predicted fuel flow, a mode having a next or second lowest predicted fuel flow, and a mode having a highest predicted fuel flow; applying multiple constraints to each of the prioritized modes including incorporating boost as one of the constraints by calculating a maximum torque capacity for each of the modes that is a function of a current boost pressure; and conducting a mode determination arbitration to identify if a change in mode is required.

According to another aspect, the method includes determining the current boost pressure by measuring a total throttle inlet air pressure (TIAP) indicative of the current boost pressure.

According to another aspect, the method includes entering each of a torque request and a filtered torque request; and applying an offset to the maximum torque capacity for each of the modes.

According to another aspect, the method includes comparing the filtered torque request to the maximum torque capacity plus the offset during the conducting step.

According to another aspect, the offset of one of the maximum torque capacities defines a slow exit threshold wherein when the filtered torque request exceeds the maximum torque capacity of the slow exit threshold a mode change is directed.

According to another aspect, the offset of another one of the maximum torque capacities defines a fast exit threshold, wherein when the torque request exceeds the maximum torque capacity of the fast exit threshold a mode change is directed.

According to several aspects, a control method for selecting an optimal multiple step operating mode for a multiple cylinder motor vehicle engine system having variable lift, includes: prioritizing each of a full torque capacity (FTC) mode having all cylinders operating at high lift, a first reduced capacity economy mode (RCE1) having all cylinders operating at low lift, and a second reduced capacity economy mode (RCE2) having fewer than all of the cylinders operating at low lift with at least one cylinder deactivated based on predicted fuel economy of each of the modes; sorting the prioritized modes between mode having a lowest predicted fuel flow, a mode having a next or second lowest predicted fuel flow, and a mode having a highest predicted fuel flow; applying multiple constraints to each of the prioritized modes including incorporating boost as one of the constraints by calculating a maximum torque capacity for each of the modes that is a function of a current boost pressure; adding each of a slow exit offset and a fast exit offset to the maximum torque capacity for each of the modes; and conducting a mode determination arbitration to identify if a change in mode is required when either the slow exit offset or the fast exit offset is exceeded.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
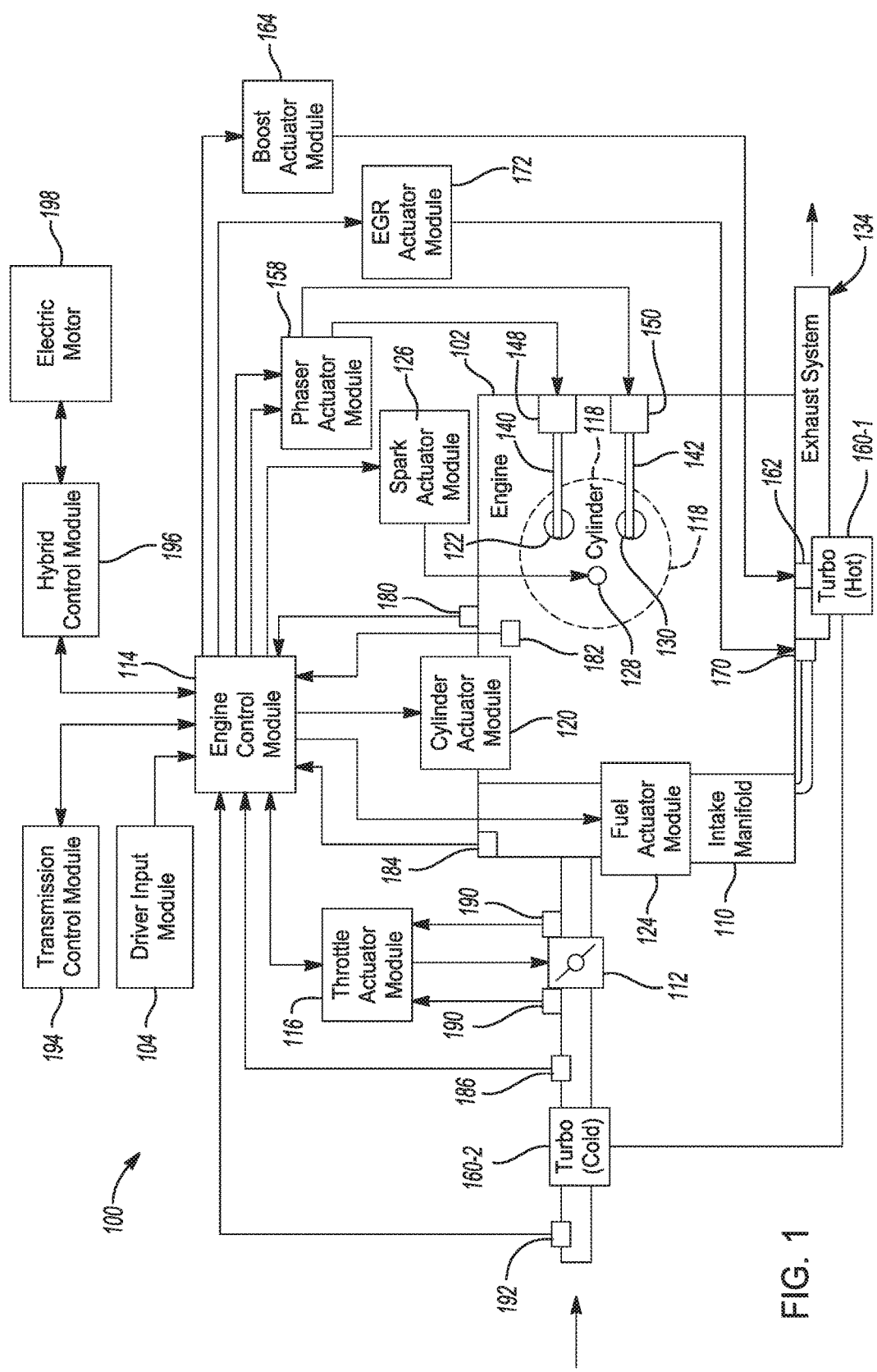
FIG. 1 is a functional block diagram of an exemplary engine system according to an exemplary embodiment.

The following description is merely exemplary in nature and is not intended to limit the present disclosure, application, or uses. For purposes of clarity, the same reference numbers will be used in the drawings to identify similar elements. As used herein, the phrase at least one of A, B, and C should be construed to mean a logical (A or B or C), using a non-exclusive logical "or". It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

An engine control module (ECM) may selectively operate an engine in one or more increased fuel economy (FE) modes. For example only, the ECM may operate an engine in a cylinder deactivation mode and/or in a low-lift mode. The ECM may deactivate one or more cylinders during operation in the cylinder deactivation mode. During operation in the low-lift mode, a camshaft may open an associated valve of a cylinder to a lesser extent and/or for a lesser period than during operation in another lift mode (e.g., a high-lift mode). Generally, the maximum torque that the engine can produce during operation in an FE mode is limited, but FE is increased.

Referring to FIG. 1, a functional block diagram of an exemplary engine system 100 is presented. The engine system 100 includes an engine 102 that combusts an air/fuel mixture to produce drive torque for a vehicle based on driver input from a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with the air and creates an air/fuel mixture in the cylinder 118. During the compression stroke, a piston (not shown) within the cylinder 118 compresses the air/fuel mixture. The engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing is changed between a last firing event and the next firing event.

During the combustion stroke, the combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1 that compresses air leading into the throttle valve 112. In other implementations, a supercharger (not shown), driven by the crankshaft, may compress air from the throttle valve 112 and deliver the compressed air to the intake manifold 110.

A wastegate 162 allows exhaust to bypass the turbine 160-1, thereby reducing the boost (the amount of intake air compression) created by the turbocharger. The ECM 114 may control the turbocharger via a boost actuator module 164. The boost actuator module 164 modulates the boost of the turbocharger by controlling the position of the wastegate 162. In other implementations, multiple turbochargers may be controlled by the boost actuator module 164. The turbocharger can have variable geometry, which is controlled by the boost actuator module 164.

An intercooler (not shown) dissipates some of the heat contained in the compressed air charge, which is generated as the air is compressed. The compressed air charge also includes absorbed heat from components of the exhaust system 134. Although shown separated for purposes of illustration, the turbine 160-1 and the compressor 160-2 can be attached to each other, placing intake air in close proximity to hot exhaust.

The engine system 100 includes an exhaust gas recirculation (EGR) valve 170, which selectively redirects exhaust gas back to the intake manifold 110. The EGR valve 170 may be located upstream of the turbocharger's turbine 160-1. The EGR valve 170 is controlled by an EGR actuator module 172.

The engine system 100 measures the speed of the crankshaft in revolutions per minute (RPM) using an RPM sensor 180. The temperature of the engine coolant is measured using an engine coolant temperature (ECT) sensor 182. The ECT sensor 182 is located within the engine 102 or at other locations where the coolant is circulated, such as a radiator (not shown).

The pressure within the intake manifold 110 is measured using a manifold absolute pressure (MAP) sensor 184. In various implementations, engine vacuum, which is the difference between ambient air pressure and the pressure within the intake manifold 110, is measured. The mass flow rate of air flowing into the intake manifold 110 is measured using a mass air flow (MAF) sensor 186. In various implementations, the MAF sensor 186 is located in a housing that also includes the throttle valve 112.

The throttle actuator module 116 monitors the position of the throttle valve 112 using one or more throttle position sensors (TPS) 190. The ambient temperature of air being drawn into the engine 102 is measured using an intake air temperature (IAT) sensor 192. The ECM 114 uses signals from the sensors to make control decisions for the engine system 100.

The ECM 114 communicates with a transmission control module 194 to coordinate shifting gears in a transmission (not shown). For example, the ECM 114 reduces engine torque during a gear shift. The ECM 114 may also communicate with a hybrid control module 196 to coordinate operation of the engine 102 and an electric motor 198 when present.

The electric motor 198 can function as a generator to produce electrical energy for use by vehicle electrical systems and/or for storage in a battery. In various implementations, various functions of the ECM 114, the transmission control module 194, and the hybrid control module 196 are integrated into one or more modules.

Each system that varies an engine parameter is referred to as an actuator that receives an actuator value. For example, the throttle actuator module 116 is referred to as an actuator and the throttle opening area is referred to as the actuator value. In the example of FIG. 1, the throttle actuator module 116 achieves the throttle opening area by adjusting an angle of the blade of the throttle valve 112.

Similarly, the spark actuator module 126 is referred to as an actuator, while the corresponding actuator value is the amount of spark advance relative to cylinder TDC. Other actuators include the cylinder actuator module 120, the fuel actuator module 124, the phaser actuator module 158, the boost actuator module 164, and the EGR actuator module 172. For these actuators, the actuator values correspond to number of activated cylinders, fueling rate, intake and exhaust cam phaser angles, boost pressure, and EGR valve opening area, respectively. The ECM 114 controls actuator values in order to cause the engine 102 to generate a desired engine output torque.

Referring to FIG. 2 and again to FIG. 1, a functional block diagram of an exemplary engine control system is presented. An exemplary implementation of the ECM 114 includes a driver torque module 202, an axle torque arbitration module 204, and a propulsion torque arbitration module 206. The ECM 114 may also include a hybrid optimization module 208. The exemplary implementation of the ECM 114 also includes a reserves/loads module 220, an actuation module 224, an air control module 228, a spark control module 232, a cylinder control module 236, and a fuel control module 240. The exemplary implementation of the ECM 114 also includes a torque estimation module 244, a boost scheduling module 248, and a phaser scheduling module 252.

The driver torque module 202 determines a driver torque request 254 based on a driver input 255 from the driver input module 104. According to several aspects, the driver input 255 is based on a position of an accelerator pedal and may also include a position of a brake pedal. The driver input 255 may also be based on cruise control, which may be an adaptive cruise control system that varies vehicle speed to maintain a predetermined following distance. The driver torque module 202 may store one or more mappings of accelerator pedal position to desired torque as described in further detail below and may determine the driver torque request 254 based on a selected one of the mappings.

An axle torque arbitration module 204 arbitrates between the driver torque request 254 and other axle torque requests 256. Axle torque (torque at the wheels) is produced by various sources including an engine and/or an electric motor. Generally, torque requests may include absolute torque requests as well as relative torque requests and ramp requests. For example only, ramp requests may include a request to ramp torque down to a minimum engine off torque or to ramp torque up from the minimum engine off torque. Relative torque requests may include temporary or persistent torque reductions or increases.

The axle torque requests 256 can further include a torque reduction requested by a traction control system when positive wheel slip is detected. Positive wheel slip occurs when axle torque overcomes friction between the wheels and the road surface, and the wheels begin to slip against the road surface. The axle torque requests 256 may also include a torque increase request to counteract negative wheel slip, where a tire of the vehicle slips in the other direction with respect to the road surface because the axle torque is negative.

The axle torque requests 256 may also include brake management requests and vehicle over-speed torque requests. Brake management requests may reduce axle torque to ensure that the axle torque does not exceed the ability of the brakes to hold the vehicle when the vehicle is stopped. Vehicle over-speed torque requests may reduce the axle torque to prevent the vehicle from exceeding a predetermined speed. The axle torque requests 256 may also be generated by vehicle stability control systems.

The axle torque arbitration module 204 outputs a predicted torque request 257 and an immediate torque request 258 based on the results of arbitrating between the received torque requests 254 and 256. As described below, the predicted and immediate torque requests 257 and 258 from the axle torque arbitration module 204 may selectively be adjusted by other modules of the ECM 114 before being used to control actuators of the engine system 100.

In general terms, the immediate torque request 258 is the amount of currently desired axle torque, while the predicted torque request 257 is the amount of axle torque that may be needed on short notice. The ECM 114 controls the engine system 100 to produce an axle torque equal to the immediate torque request 258. However, different combinations of actuator values may result in the same axle torque. The ECM 114 may therefore adjust the actuator values to allow a faster transition to the predicted torque request 257, while still maintaining the axle torque at the immediate torque request 258.

In various implementations, the predicted torque request 257 may be based on the driver torque request 254. The immediate torque request 258 may be less than the predicted torque request 257, such as when the driver torque request 254 is causing wheel slip on an icy surface. In such a case, a traction control system (not shown) may request a reduction via the immediate torque request 258, and the ECM 114 reduces the torque produced by the engine system 100 to the immediate torque request 258. However, the ECM 114 controls the engine system 100 so that the engine system 100 can quickly resume producing the predicted torque request 257 once the wheel slip stops.

In general terms, the difference between the immediate torque request 258 and the (generally higher) predicted torque request 257 can be referred to as a torque reserve. The torque reserve may represent the amount of additional torque (above the immediate torque request 258) that the engine system 100 can begin to produce with minimal delay. Fast engine actuators are used to increase or decrease current axle torque. As described in more detail below, fast engine actuators are defined in contrast with slow engine actuators.

In various implementations, fast engine actuators are capable of varying axle torque within a range, where the range is established by the slow engine actuators. In such implementations, the upper limit of the range is the predicted torque request 257, while the lower limit of the range is limited by the torque capacity of the fast actuators. For example only, fast actuators may only be able to reduce axle torque by a first amount, where the first amount is a measure of the torque capacity of the fast actuators. The first amount may vary based on engine operating conditions set by the slow engine actuators. When the immediate torque request 258 is within the range, fast engine actuators can be set to cause the axle torque to be equal to the immediate torque request 258. When the ECM 114 requests the predicted torque request 257 to be output, the fast engine actuators can be controlled to vary the axle torque to the top of the range, which is the predicted torque request 257.

In general terms, fast engine actuators can more quickly change the axle torque when compared to slow engine actuators. Slow actuators may respond more slowly to changes in their respective actuator values than fast actuators do. For example, a slow actuator may include mechanical components that require time to move from one position to another in response to a change in actuator value. A slow actuator may also be characterized by the amount of time it takes for the axle torque to begin to change once the slow actuator begins to implement the changed actuator value. Generally, this amount of time will be longer for slow actuators than for fast actuators. In addition, even after beginning to change, the axle torque may take longer to fully respond to a change in a slow actuator.

For example only, the ECM 114 may set actuator values for slow actuators to values that would enable the engine system 100 to produce the predicted torque request 257 if the fast actuators were set to appropriate values. Meanwhile, the ECM 114 may set actuator values for fast actuators to values that, given the slow actuator values, cause the engine system 100 to produce the immediate torque request 258 instead of the predicted torque request 257.

The fast actuator values therefore cause the engine system 100 to produce the immediate torque request 258. When the ECM 114 decides to transition the axle torque from the immediate torque request 258 to the predicted torque request 257, the ECM 114 changes the actuator values for one or more fast actuators to values that correspond to the predicted torque request 257. Because the slow actuator values have already been set based on the predicted torque request 257, the engine system 100 is able to produce the predicted torque request 257 after only the delay imposed by the fast actuators. In other words, the longer delay that would otherwise result from changing axle torque using slow actuators is avoided.

For example only, when the predicted torque request 257 is equal to the driver torque request 254, a torque reserve may be created when the immediate torque request 258 is less than the driver torque request 254 due to a temporary torque reduction request. Alternatively, a torque reserve may be created by increasing the predicted torque request 257 above the driver torque request 254 while maintaining the immediate torque request 258 at the driver torque request 254. The resulting torque reserve can absorb sudden increases in required axle torque. For example only, sudden loads imposed by an air conditioner or a power steering pump may be counteracted by increasing the immediate torque request 258. If the increase in the immediate torque request 258 is less than the torque reserve, the increase can be quickly produced by using fast actuators. The predicted torque request 257 may also be increased to re-establish the previous torque reserve.

Another example use of a torque reserve is to reduce fluctuations in slow actuator values. Because of their relatively slow speed, varying slow actuator values may produce control instability. In addition, slow actuators may include mechanical parts, which may draw more power and/or wear more quickly when moved frequently. Creating a sufficient torque reserve allows changes in desired torque to be made by varying fast actuators via the immediate torque request 258 while maintaining the values of the slow actuators. For example, to maintain a given idle speed, the immediate torque request 258 may vary within a range. If the predicted torque request 257 is set to a level above this range, variations in the immediate torque request 258 that maintain the idle speed can be made using fast actuators without the need to adjust slow actuators.

For example only, in a spark-ignition engine, spark timing may be a fast actuator value, while throttle opening area may be a slow actuator value. Spark-ignition engines may combust fuels including, for example, gasoline and ethanol, by applying a spark. By contrast, in a compression-ignition engine, fuel flow may be a fast actuator value, while throttle opening area may be used as an actuator value for engine characteristics other than torque. Compression-ignition engines may combust fuels including, for example, diesel, by compressing the fuels.

When the engine 102 is a spark-ignition engine, the spark actuator module 126 may be a fast actuator and the throttle actuator module 116 may be a slow actuator. After receiving a new actuator value, the spark actuator module 126 may be able to change spark timing for the following firing event. When the spark timing (also called spark advance) for a firing event is set to an optimum value, a maximum amount of torque may be produced in the combustion stroke immediately following the firing event. However, a spark advance deviating from the optimum value may reduce the amount of torque produced in the combustion stroke. Therefore, the spark actuator module 126 may be able to vary engine output torque as soon as the next firing event occurs by varying spark advance. For example only, a table of spark advances corresponding to different engine operating conditions may be determined during a calibration phase of vehicle design, and the optimum value is selected from the table based on current engine operating conditions.

By contrast, changes in throttle opening area take longer to affect engine output torque. The throttle actuator module 116 changes the throttle opening area by adjusting the angle of the blade of the throttle valve 112. Therefore, once a new actuator value is received, there is a mechanical delay as the throttle valve 112 moves from its previous position to a new position based on the new actuator value. In addition, air flow changes based on the throttle opening area are subject to air transport delays in the intake manifold 110. Further, increased air flow in the intake manifold 110 is not realized as an increase in engine output torque until the cylinder 118 receives additional air in the next intake stroke, compresses the additional air, and commences the combustion stroke.

Using these actuators as an example, a torque reserve can be created by setting the throttle opening area to a value that would allow the engine 102 to produce the predicted torque request 257. Meanwhile, the spark timing can be set based on the immediate torque request 258, which is less than the predicted torque request 257. Although the throttle opening area generates enough air flow for the engine 102 to produce the predicted torque request 257, the spark timing is retarded (which reduces torque) based on the immediate torque request 258. The engine output torque will therefore be equal to the immediate torque request 258.

When additional torque is needed, the spark timing can be set based on the predicted torque request 257 or a torque between the predicted and immediate torque requests 257 and 258. By the following firing event, the spark actuator module 126 may return the spark advance to an optimum value, which allows the engine 102 to produce the full engine output torque achievable with the air flow already present. The engine output torque may therefore be quickly increased to the predicted torque request 257 without experiencing delays from changing the throttle opening area.

When the engine 102 is a compression-ignition engine, the fuel actuator module 124 may be a fast actuator and the throttle actuator module 116 and the boost actuator module 164 may be emissions actuators. The fuel mass may be set based on the immediate torque request 258, and the throttle opening area, boost, and EGR opening may be set based on the predicted torque request 257. The throttle opening area may generate more air flow than necessary to satisfy the predicted torque request 257. In turn, the air flow generated may be more than required for complete combustion of the injected fuel such that the air/fuel ratio is usually lean and changes in air flow do not affect the engine output torque. The engine output torque will therefore be equal to the immediate torque request 258 and may be increased or decreased by adjusting the fuel flow.

The throttle actuator module 116, the boost actuator module 164, and the EGR valve 170 may be controlled based on the predicted torque request 257 to control emissions and to minimize turbo lag. The throttle actuator module 116 may create a vacuum within the intake manifold 110 to draw exhaust gases through the EGR valve 170 and into the intake manifold 110.

The axle torque arbitration module 204 may output the predicted torque request 257 and the immediate torque request 258 to a propulsion torque arbitration module 206. In various implementations, the axle torque arbitration module 204 may output the predicted and immediate torque requests 257 and 258 to the hybrid optimization module 208.

The hybrid optimization module 208 may determine how much torque should be produced by the engine 102 and how much torque should be produced by the electric motor 198. The hybrid optimization module 208 then outputs modified predicted and immediate torque requests 259 and 260, respectively, to the propulsion torque arbitration module 206. In various implementations, the hybrid optimization module 208 may be implemented in the hybrid control module 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests 279, including the converted predicted and immediate torque requests. The propulsion torque arbitration module 206 generates an arbitrated predicted torque request 261 and an arbitrated immediate torque request 262. The arbitrated torque requests 261 and 262 may be generated by selecting a winning request from among received torque requests. Alternatively or additionally, the arbitrated torque requests may be generated by modifying one of the received requests based on another one or more of the received torque requests.

The propulsion torque requests 279 may include torque reductions for engine over-speed protection, torque increases for stall prevention, and torque reductions requested by the transmission control module 194 to accommodate gear shifts. The propulsion torque requests 279 may also result from clutch fuel cutoff, which reduces the engine output torque when the driver depresses the clutch pedal in a manual transmission vehicle to prevent a flare (rapid rise) in engine speed.

The propulsion torque requests 279 may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated predicted and immediate torque requests 261 and 262.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other torque requestors may be informed that they have lost arbitration.

The reserves/loads module 220 receives the arbitrated predicted and immediate torque requests 261 and 262. The reserves/loads module 220 may adjust the arbitrated predicted and immediate torque requests 261 and 262 to create a torque reserve and/or to compensate for one or more loads. The reserves/loads module 220 then outputs adjusted predicted and immediate torque requests 263 and 264 to the actuation module 224.

For example only, a catalyst light-off process or a cold start emissions reduction process may require retarded spark advance. The reserves/loads module 220 may therefore increase the adjusted predicted torque request 263 above the adjusted immediate torque request 264 to create retarded spark for the cold start emissions reduction process. In another example, the air/fuel ratio of the engine and/or the mass air flow may be directly varied, such as by diagnostic intrusive equivalence ratio testing and/or new engine purging. Before beginning these processes, a torque reserve may be created or increased to quickly offset decreases in engine output torque that result from leaning the air/fuel mixture during these processes.

The reserves/loads module 220 may also create or increase a torque reserve in anticipation of a future load, such as power steering pump operation or engagement of an air conditioning (A/C) compressor clutch. The reserve for engagement of the A/C compressor clutch may be created when the driver first requests air conditioning. The reserves/loads module 220 may increase the adjusted predicted torque request 263 while leaving the adjusted immediate torque request 264 unchanged to produce the torque reserve. Then, when the NC compressor clutch engages, the reserves/loads module 220 may increase the adjusted immediate torque request 264 by the estimated load of the A/C compressor clutch.

The actuation module 224 receives the adjusted predicted and immediate torque requests 263 and 264. The actuation module 224 determines how the adjusted predicted and immediate torque requests 263 and 264 will be achieved. The actuation module 224 may be engine type specific. For example, the actuation module 224 may be implemented differently or use different control schemes for spark-ignition engines versus compression-ignition engines.

In various implementations, the actuation module 224 may define a boundary between modules that are common across all engine types and modules that are engine type specific. For example, engine types may include spark-ignition and compression-ignition. Modules prior to the actuation module 224, such as the propulsion torque arbitration module 206, may be common across engine types, while the actuation module 224 and subsequent modules may be engine type specific.

For example, in a spark-ignition engine, the actuation module 224 may vary the opening of the throttle valve 112 as a slow actuator that allows for a wide range of torque control. The actuation module 224 may disable cylinders using the cylinder actuator module 120, which also provides for a wide range of torque control, but may also be slow and may involve drivability and emissions concerns. The actuation module 224 may use spark timing as a fast actuator. However, spark timing may not provide as much range of torque control. In addition, the amount of torque control possible with changes in spark timing (referred to as spark reserve capacity) may vary as air flow changes.

In various implementations, the actuation module 224 may generate an air torque request 265 based on the adjusted predicted torque request 263. The air torque request 265 may be equal to the adjusted predicted torque request 263, setting air flow so that the adjusted predicted torque request 263 can be achieved by changes to other actuators.

The air control module 228 may determine desired actuator values based on the air torque request 265. For example only, the air control module 228 may determine a desired manifold absolute pressure (MAP) 266, a desired throttle area 267, and/or a desired air per cylinder (APC) 268 based on the air torque request 265. The desired MAP 266 may be used to determine a desired boost, and the desired APC 268 may be used to determine desired cam phaser positions and the desired throttle area 267. In various implementations, the air control module 228 may also determine an amount of opening of the EGR valve 170 based on the air torque request 265.

The actuation module 224 may also generate a spark torque request 269, a cylinder shut-off torque request 270, and a fuel torque request 271. The spark torque request 269 may be used by the spark control module 232 to determine how much to retard the spark timing (which reduces engine output torque) from an optimum spark timing.

The cylinder shut-off torque request 270 may be used by the cylinder control module 236 to determine how many cylinders to deactivate when operation in a fuel economy (FE) mode is requested. The FE mode may include, for example only, an active fuel management (AFM) mode or a displacement on demand (DOD).

The cylinder control module 236 may instruct the cylinder actuator module 120 to deactivate one or more cylinders of the engine 102 when the AFM mode is commanded. The cylinder actuator module 120 may include a hydraulic system that selectively decouples intake and/or exhaust valves from the corresponding camshafts for one or more cylinders in order to deactivate those cylinders. For example only, the cylinder actuator module 120 may deactivate a predefined group of cylinders (e.g., half) jointly when the AFM mode is commanded. The cylinder control module 236 may also instruct the fuel control module 240 to stop providing fuel for deactivated cylinders and may instruct the spark control module 232 to stop providing spark for deactivated cylinders when the AFM mode is commanded. The spark control module 232 may stop providing spark for a cylinder once an fuel/air mixture that is already present in the cylinder has been combusted.

Some vehicles may additionally or alternatively be capable of operating the engine 102 in a fuel cutoff (FCO) mode. For example only, operation in the FCO mode may be commanded during vehicle deceleration. Operation in the FCO mode commanded pursuant to vehicle deceleration may be referred to as deceleration fuel cutoff (DFCO). In contrast with the AFM mode, one or more cylinders may be deactivated by halting provision of fuel to those cylinders when the FCO mode is commanded, without stopping the opening and closing of the intake and exhaust valves.

The fuel control module 240 may vary the amount of fuel provided to each cylinder based on the fuel torque request 271. During normal operation of a spark-ignition engine, the fuel control module 240 may operate in an air lead mode in which the fuel control module 240 attempts to maintain a stoichiometric air/fuel ratio by controlling fueling based on air flow. The fuel control module 240 may determine a fuel mass that will yield stoichiometric combustion when combined with the current amount of air per cylinder. The fuel control module 240 may instruct the fuel actuator module 124 via a fueling rate to inject this fuel mass for each activated cylinder.

In compression-ignition systems, the fuel control module 240 may operate in a fuel lead mode in which the fuel control module 240 determines a fuel mass for each cylinder that satisfies the fuel torque request 271 while minimizing emissions, noise, and fuel consumption. In the fuel lead mode, air flow is controlled based on fuel flow and may be controlled to yield a lean air/fuel ratio. In addition, the air/fuel ratio may be maintained above a predetermined level, which may prevent black smoke production in dynamic engine operating conditions.

The torque estimation module 244 may determine an achieved torque output of the engine 102. The achieved torque output of the engine 102 under the current operating conditions may be called an achieved air torque 272. The achieved air torque 272 may be used by the air control module 228 to perform closed-loop control of one or more engine air flow parameters, such as throttle area, MAP, and phaser positions. For example, an APC to torque relationship 273 such as: (1) $T=f(APC,S,I,E,AF,OT,\#)$ may be defined, where torque (T) is the achieved air torque 272 and is a function of air per cylinder (APC), spark timing (S), intake cam phaser position (I), exhaust cam phaser position (E), air/fuel ratio (AF), oil temperature (OT), and number of activated cylinders (#). Additional variables may also be accounted for, such as the degree of opening of an exhaust gas recirculation (EGR) valve. The APC to torque relationship 273 may be modeled by an equation and/or may be stored as a lookup table. The intake and exhaust cam phaser positions used may be based on actual positions, as the phasers may be traveling toward desired positions. The actual spark advance may be used to determine the achieved air torque 272.

The air control module 228 may output the desired throttle area 267 to the throttle actuator module 116. The throttle actuator module 116 then regulates the throttle valve 112 to produce the desired throttle area 267. The air control module 228 may determine the desired throttle area 267 based on the air torque request 265 as discussed further below.

The air control module 228 may output the desired MAP 266 to the boost scheduling module 248. The boost scheduling module 248 uses the desired MAP 266 to control the boost actuator module 164. The boost actuator module 164 then controls one or more turbochargers (e.g., the turbocharger including the turbine 160-1 and the compressor 160-2) and/or superchargers.

The air control module 228 outputs the desired APC 268 to the phaser scheduling module 252. Based on the desired APC 268 and the RPM signal, the phaser scheduling module 252 may control positions of the intake and/or exhaust cam phasers 148 and 150 using the phaser actuator module 158.

Referring back to the spark control module 232, the optimum spark timing may vary based on various engine operating conditions. For example only, a torque relationship may be inverted to solve for desired spark advance. For a given torque request ($T_{des}$), the desired spark advance ($S_{des}$) may be determined based on: (2) $S_{des}=T^{-1}(T_{des},APC,I,E,AF,OT,\#)$. This relationship may be embodied as an equation and/or as a lookup table. The air/fuel ratio (AF) may be the actual air/fuel ratio, as reported by the fuel control module 240.

When the spark advance is set to the optimum spark timing, the resulting torque may be as close to a maximum best torque (MBT) as possible. MBT refers to the maximum engine output torque that is generated for a given air flow as spark advance is increased, while using fuel having an octane rating greater than a predetermined octane rating and using stoichiometric fueling. The spark advance at which this maximum torque occurs is referred to as an MBT spark timing. The optimum spark timing may differ slightly from MBT spark timing because of, for example, fuel quality (such as when lower octane fuel is used) and environmental factors. The engine output torque at the optimum spark timing may therefore be less than MBT.

The exemplary implementation of the ECM 114 also includes a max torque determination module 280, a correction module 282, and a fuel economy (FE) mode control module 284.

The max torque determination module 280 determines a maximum brake torque for operation in a FE mode (Max FE Brake Torque) 286. The maximum FE brake torque 286 corresponds to a maximum engine output (flywheel) torque for operating in the FE mode. When operating in the FE mode, the torque production capability of the engine 102 is limited, but FE of the vehicle is increased.

For example only, the FE mode may be an active fuel management (AFM) mode in a vehicle that is capable of performing selective cylinder deactivation or a low-lift mode in a vehicle that is capable of performing variable valve lift (VVL). Operating in the AFM mode may include deactivating a predetermined number (e.g., half) of the cylinders of the engine 102. Operating in the low-lift mode may include opening at least one of the intake and the exhaust valves 122 and 130 for a lesser period of time (referred to as duration) and/or to a lesser extent (referred to as lift).

The max torque determination module 280 determines the maximum FE brake torque 286 using a relationship 287 between MAP and torque. The MAP to torque relationship 287 may be modeled by an equation and/or may be stored as a lookup table. For example, the MAP to torque relationship 287 may be: (3) $T=f(MAP,S,I,E,AF,OT,\#,RPM)$ where torque (T) is the maximum FE brake torque 286 and is a function of manifold absolute pressure (MAP), spark timing (S), intake cam phaser position (I), exhaust cam phaser position (E), air/fuel ratio (AF), oil temperature (OT), number of activated cylinders (#), and engine speed (RPM). Additional variables may also be accounted for, such as the degree of opening of an exhaust gas recirculation (EGR) valve.

The max torque determination module 280 determines a desired maximum MAP for operation in the FE mode (Desired Max FE MAP). The MAP used in the MAP to torque relationship 287 may be the desired maximum FE MAP. However, the torques determined using the APC to torque relationship 273 and the MAP to torque relationship 287, respectively, may be different under some circumstances. The max torque determination module 280 selectively adjusts the maximum FE brake torque 286 based on a MAP to torque correction 288 that may be provided by the correction module 282. The max torque determination module 280 may correct the MAP to torque relationship 287 based on the MAP to torque correction 288 so that a brake torque determined based on the MAP will be the same as a brake torque determined based on the APC using the APC to torque relationship 273.

The desired maximum FE MAP is a MAP that corresponds to a desired minimum vacuum for operation in the FE mode (Desired Min FE Vacuum). The max torque determination module 280 converts the desired maximum FE MAP into a desired maximum APC for operation in the FE mode (Desired Max FE APC) using a MAP to APC relationship 289.

However, an APC determined by converting a MAP into the APC using the MAP to APC relationship 289 may be different than an actual APC while operating at the desired maximum FE MAP. Accordingly, the max torque determination module 280 selectively adjusts the desired maximum FE APC based on a MAP to APC correction 290 that may be provided by the correction module 282.

The FE mode control module 284 determines a maximum noise, vibration, and harshness (NVH) torque for operation in the FE mode (Max NVH Torque). The maximum NVH torque corresponds to a maximum engine output torque during operation in the FE mode above which more than a predetermined NVH level may be experienced within a passenger cabin of the vehicle.

The FE mode control module 284 sets a maximum torque for the FE mode (Max FE Torque) 291 equal to a lesser one of the maximum FE brake torque 286 and the maximum NVH torque. The FE mode control module 284 selectively triggers entry into the FE mode (when not operating in the FE mode) and selectively triggers exit out of the FE mode (when operating in the FE mode) based on the maximum FE torque 291. The FE mode control module 284 generates an FE mode signal 292 that indicates whether to operate the engine 102 in the FE mode.

The FE mode control module 284 provides the maximum FE torque 291 and the FE mode signal 292 to the air control module 228. The air control module 228 limits the air torque request 265 to the maximum FE torque 291 when the FE mode signal 292 indicates that the engine 102 should be controlled in the FE mode. The air control module 228 determines the desired MAP 266, the desired throttle area 267, and the desired APC 268 based on the air torque request 265.

Figure 2:
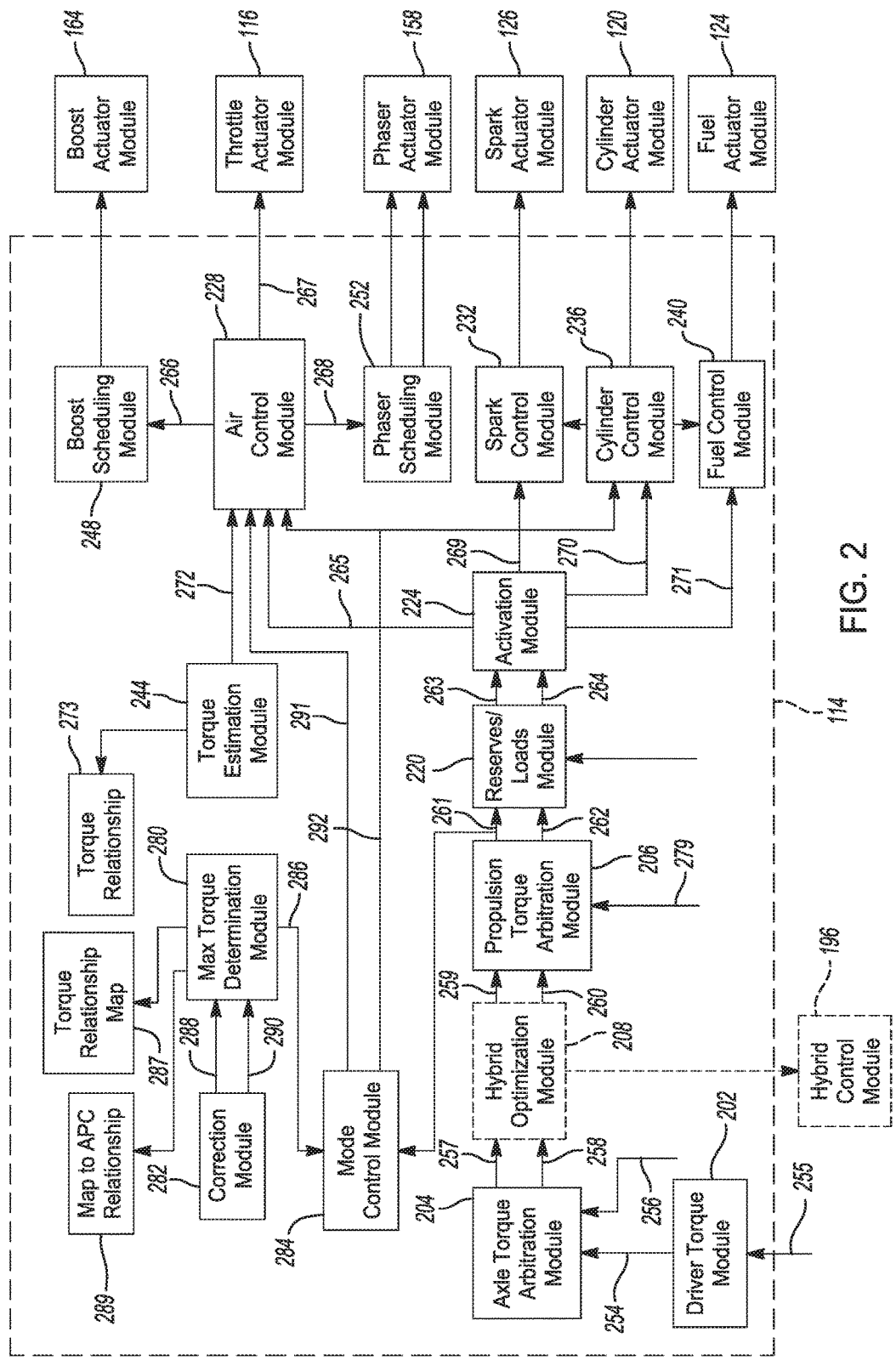
FIG. 2 is a functional block diagram of an exemplary engine control system according to an exemplary embodiment.

Referring to FIG. 3 and again to FIGS. 1 through 2, a control method for selecting an optimal multiple-step operating mode 300 of the present disclosure for a multiple-step valvetrain is presented which can be used on a boosted engine system. The multiple-step valvetrain provides a sliding cam which allows multiple modes of operation and therefore multiple opportunities for selecting between the modes to optimize fuel economy. During operation in a low-lift mode, the camshaft may open an associated valve of a cylinder to a lesser extent and/or for a lesser period than during operation in another lift mode (e.g., a high-lift mode). As noted above, the FE mode may be an active fuel management (AFM) mode in a vehicle that is capable of performing selective cylinder deactivation or a low-lift mode in a vehicle that is capable of performing variable valve lift (VVL). Operating in the AFM mode may include deactivating a predetermined number (e.g., half) of the cylinders of the engine 102. When the AFM mode is commanded the cylinder actuator module 120 may deactivate a predefined group of cylinders (e.g., half) jointly.

According to several aspects, the control method for selecting an optimal multiple-step operating mode 300 of the present disclosure can also be used in an AFM engine having boost, for example having 2 operating modes with boost, in a four mode AFM engine having 8, 6, 4, or 2 cylinders, or a four mode engine having different lift capability such as a four mode lift engine having for example a highest lift, a high lift, a medium lift, and a low lift.

According to several aspects, the control method for selecting an optimal multiple-step operating mode 300 of the present disclosure can also include: prioritizing at least three modes including a first mode having a highest torque capacity with a lowest fuel efficiency, a second mode having a medium torque capacity less than the highest torque capacity and with a medium fuel efficiency higher than the lowest fuel efficiency, and a third mode having a lowest torque capacity lower than the medium torque capacity and with a highest fuel efficiency higher than the medium fuel efficiency; applying torque constraint data and noise and vibration (NV) constraint data to each of the prioritized modes; and conducting a mode determination arbitration for the prioritized modes having the torque constraint data and the vibration constraint data applied to identify if a change in mode is required.

According to several aspects, the multiple-step engine operating modes of the present disclosure for an exemplary 4 cylinder engine include selecting one of a full torque capacity (FTC) mode having all four cylinders operating at high lift, a first reduced capacity economy mode (RCE1) having all four cylinders operating at low lift, and a second reduced capacity economy mode (RCE2) having two of the four cylinders operating at low lift with 2 cylinders deactivated. A comparable operation for a system having more or fewer than 4 cylinders includes selecting one of a full torque capacity (FTC) mode having all cylinders operating at high lift, a first reduced capacity economy mode (RCE1) having all cylinders operating at low lift, and a second reduced capacity economy mode (RCE2) having half or fewer than all of the cylinders operating at low lift with half of the cylinders or at least one cylinder deactivated.

To select the operating mode having the best efficiency and driveability, torque thresholds for each of the three modes are calculated as a function of current speed and torque conditions. The fuel efficiency of each of the three modes is determined using data from one or more lookup tables of fuel flow as a function of both engine speed and torque. Data in each lookup table may be predetermined from drivetrain operation on a dynamometer. Each of the modes are ranked from the mode having the lowest fuel flow (most efficient) to the mode having the highest fuel flow (least efficient). Constraint information is then incorporated, and arbitration is conducted to identify the most efficient mode that is allowed by the given constraints for mode selection.

Figure 3:
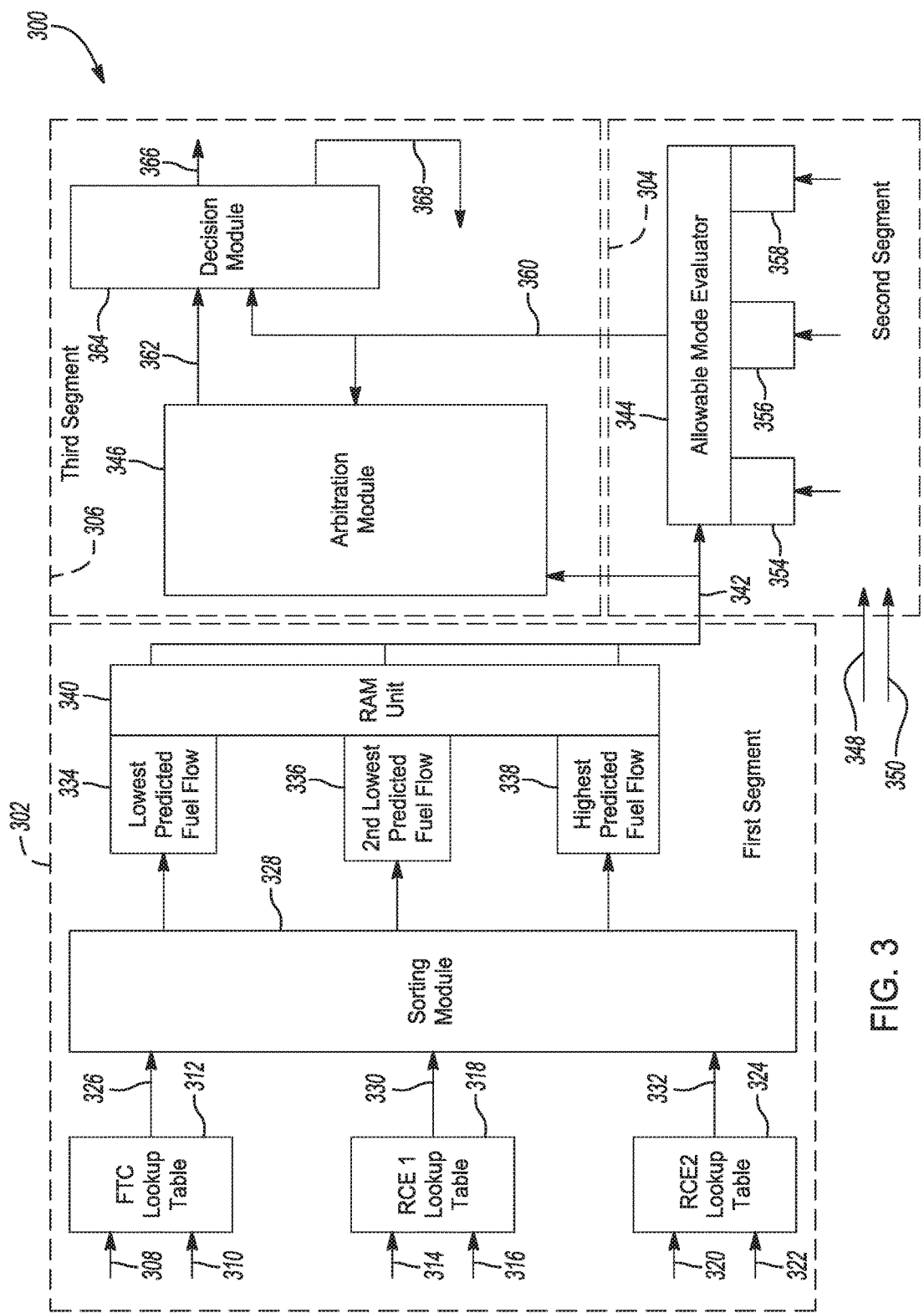
FIG. 3 is a functional block diagram of a control method for selecting an optimal multiple step operating mode.

With continuing reference to FIG. 3, according to several aspects, the method for selecting an optimal multiple-step operating mode 300 is divided into a first segment 302 wherein the 3 modes are prioritized based on predicted fuel economy, a second segment 304 wherein constraints are applied for each prioritized mode, and a third segment 306 wherein a mode determination arbitration is conducted.

In the first segment 302, a first engine speed (rpm) signal 308 and a first desired torque signal 310 are used in conjunction with full torque capacity data in a first or FTC lookup table 312. A second engine speed (rpm) signal 314 and a second desired torque signal 316 are used in conjunction with reduced capacity 4 operating cylinder low lift data in a second or RCE1 lookup table 318. A third engine speed (rpm) signal 320 and a third desired torque signal 322 are used in conjunction with reduced capacity 2 or less than all operating cylinder low lift data in a third or RCE2 lookup table 324. According to several aspects, the engine speed represented by engine speed (rpm) signal 308 and the engine speed represented by engine speed (rpm) signal 314 may be substantially the same. The engine speed represented by the engine speed (rpm) signal 320 may be the same or may be greater than the other two speed signals due to torque converter slip generated in RCE2 two cylinder low lift operation required by NV constraint limitations. The data entered into the FTC lookup table 312 generates a predicted FTC fuel flow signal 326, the data entered into the RCE1 lookup table 318 generates a predicted RCE1 fuel flow signal 330, and the data entered into the RCE2 lookup table 324 generates a predicted RCE2 fuel flow signal 332.

The FTC fuel flow signal 326, the RCE1 fuel flow signal 330 and the RCE2 fuel flow signal 332 are each communicated to a sorting module 328. The sorting module 328 sorts the three fuel flow signals 326, 330, 332 generated using the lookup table data between a lowest predicted fuel flow 334, a next or second lowest predicted fuel flow 336, and a highest predicted fuel flow 338. Each of the lowest predicted fuel flow 334, the second lowest predicted fuel flow 336, and the highest predicted fuel flow 338 are then saved in a fuel economy mode RAM unit 340.

The data saved in the fuel economy mode RAM unit 340 is forwarded as a best economy mode output 342 to each of an allowable mode evaluator 344 and an arbitration module 346. The allowable mode evaluator 344 receives constraint input data including torque constraint data 348 and noise and vibration (NV) constraint data 350. Based on the constraint data, a first RAM section 354 saves the result if FTC mode is allowed or not allowed, a second RAM section 356 saves the result if RCE1 mode is allowed or not allowed, and a third RAM section 358 saves the result if RCE2 mode is allowed or not allowed. The mode that is ranked for highest fuel economy that is also identified as allowed is transmitted as an allowable mode signal 360 from the allowable mode evaluator 344 to each of the arbitration module 346 and a mode determination module 362.

Using the best economy mode output 342 from the fuel economy mode RAM unit 340 and the allowable mode signal 360, the arbitration module 346 evaluates if continued operation in the present mode is indicated or if change to a new mode is indicated. The output decision as an arbitration output signal 362 and the allowable mode signal 360 are both communicated to a decision module 364. The decision module 364 queries if the mode is both desired and allowable. If the query result is yes, a mode signal 366 is output. If the query result is no, the current mode is maintained and the system loops back to the first segment 302. According to several aspects, each system loop time is approximately 25 ms.

The lookup tables do not provide data on whether a desired torque can be achieved in a rapid manner or in a given time period. The availability of boost as a system constraint is therefore provided for by the following features. When operating in the naturally aspirated region and for example when operating at approximately 10 Nm of engine torque a rapid change to a higher desired torque such as 140 Nm of torque can be achieved by opening the throttle. While still operating in the naturally aspirated region the higher desired torque can be achieved quickly (e.g., approximately 150 ms). However, if the engine is operating for example at 140 Nm torque and a rapid request is input to achieve a significantly higher torque such as for example 300 Nm of engine torque, there is a need to build boost. This change in torque level may take approximately one second depending on engine speed. By changing from low lift to high lift, however, engine torque change can be achieved faster.

If operation is in the fuel efficient low lift RCE1 mode and the driver torque request increases at a rate that is gradual, it is desirable for the system to remain in low lift (RCE1) mode and to slowly build up to the requested torque using boost pressure because it is more fuel efficient. The boost pressure takes time to increase because the turbocharger must spool up to compress air. However, if the driver torque request increase is fast it is desirable to jump out of the present low lift RCE1 mode to the RCE2 mode or to the full torque capacity (FTC) mode.

To incorporate boost as a constraint into the system a maximum torque capacity is calculated for each mode that is a function of the current boost pressure. To identify the value of boost pressure in each mode a total throttle inlet air pressure (TIAP) is measured, which is indicative of the current boost pressure. A filter is applied to the torque request. In order to provide a margin to allow a present fuel efficient mode to be maintained during a slow torque change request (i.e., the operator accelerator change is slow) an offset is applied to each maximum torque capacity. The filtered torque request is then compared to the maximum torque capacity plus the offset to identify if a mode change is required. The RCE1 maximum capacity torque and the RCE2 maximum capacity torque are thereby converted into torque constraints.

Referring to FIG. 4 and again to FIG. 3, a graph 368 depicts a torque range 370 and a period of time 372. A slow exit threshold 374 is added to an exemplary constrained RCEx maximum torque 376, where RCEx can be either the RCE1 maximum capacity torque or the RCE2 maximum capacity torque. A slow exit offset 377 defines a difference between the slow exit threshold 374 and the RCEx maximum torque 376. A fast exit threshold 378 is also added to the constrained RCEx maximum torque 376. A fast exit offset 379 defines a difference between the fast exit threshold 378 and the RCEx maximum torque 376. A torque request 380 is indicated as well as a filtered torque request 382. The filtered torque request 382 does not exceed the RCEx maximum torque 376 until a first torque point 384 is reached. After the RCEx maximum torque 376 is exceeded and as boost pressure builds, the use of the slow exit offset 377 permits the system to remain at the present reduced capacity RCEx mode of the filtered torque request 382 up to a second torque point 386. After the second torque point 386 is reached, the system signals a shift from the current reduced capacity mode RCEx to a higher mode. An additional period of time 388 between the first torque point 384 until the second torque point 386 is reached allows further operation at the more fuel efficient reduced capacity mode RCEx. As indicated the torque request 380 does not exceed the fast exit threshold 378 at any time.

Figure 4:
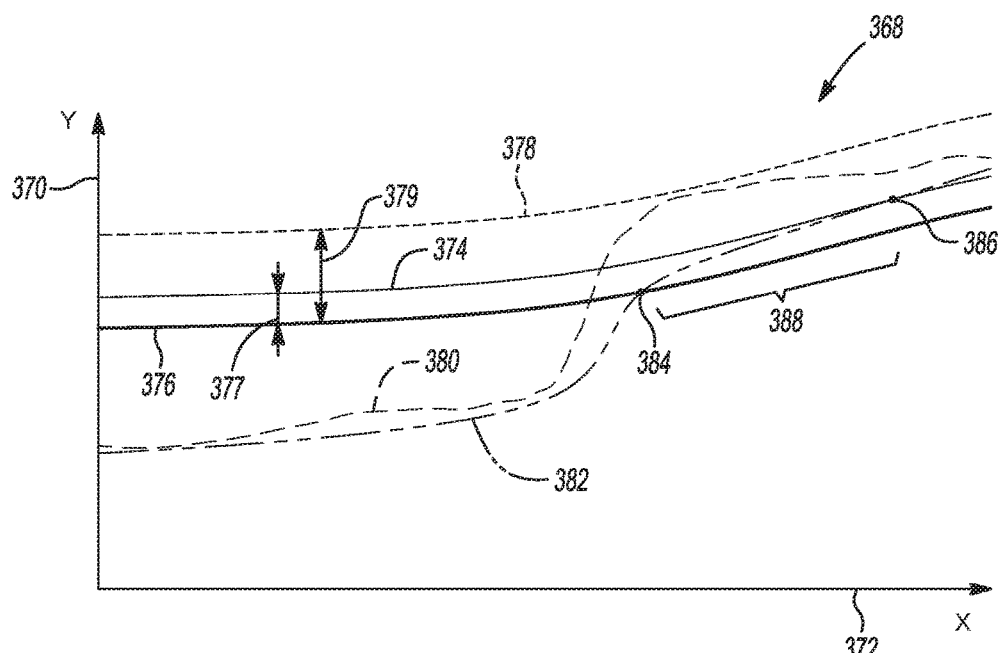
FIG. 4 is a graph depicting various torque curves having a slow exit threshold applied to a maximum capacity torque over time.
Figure 5:
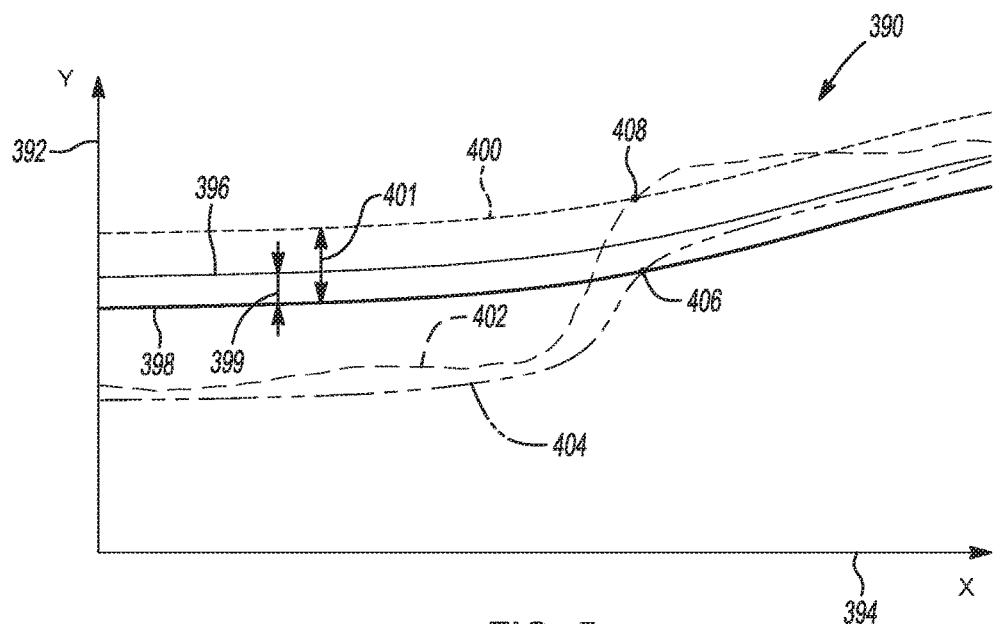
FIG. 5 is a graph depicting various torque curves having a fast exit threshold applied to a maximum capacity torque over time.

Referring to FIG. 5 and again to FIGS. 3 through 4, in a fast exit example a graph 390 depicts a torque range 392 and a period of time 394. A slow exit threshold 396 is added to an exemplary constrained RCEx maximum torque 398, where RCEx can be either the RCE1 maximum capacity torque or the RCE2 maximum capacity torque. A slow exit offset 399 defines a difference between the slow exit threshold 396 and the RCEx maximum torque 398. A fast exit threshold 400 is also added to the constrained RCEx maximum torque 398. A fast exit offset 401 defines a difference between the fast exit threshold 400 and the RCEx maximum torque 398. A torque request 402 is indicated as well as a filtered torque request 404. The filtered torque request 404 exceeds the RCEx maximum torque 398 at a first torque point 406, however in this example the filtered torque request 404 does not exceed the slow exit threshold 396. The torque request 402 exceeds the fast exit threshold 400 at a second torque point 408. After the fast exit threshold 400 is exceeded the system signals a shift from the current reduced capacity mode RCEx to a higher mode.

As used herein, the at least two variable capacity modes of operation can include modes defining variable valve lift per cylinder, or modes defining cylinder deactivation, or combinations of the two. The at least two variable capacity modes of operation can also include an AFM engine having boost such as a 2-mode operation with boost. The at least two variable capacity modes of operation can also include a four (4) mode AFM engine having a choice of 8 operating cylinders, 6 operating cylinders, 4 operating cylinders, or 2 operating cylinders. As noted herein, the at least two variable capacity modes of operation can also include a four (4) mode engine having different lift (highest lift, high lift, medium lift, and low lift). As also noted herein, the at least two variable capacity modes of operation can also include a first mode defining a full torque capacity (FTC) mode having all cylinders operating at high lift, a second mode defining a first reduced capacity economy mode (RCE1) having all cylinders operating at low lift, and a third mode defining a second reduced capacity economy mode (RCE2) having fewer than all of the cylinders operating.

A control method for selecting an optimal multiple-step operating mode of the present disclosure offers several advantages. These include providing the most efficient operating mode in a multiple mode operating system by a prioritizing fuel efficiencies for different modes, incorporating boost as a constraint in the system, and use of thresholds to expand the range of operation within a current reduced capacity mode.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A control method for selecting an optimal multiple-step operating mode for a motor vehicle engine system, comprising:
   providing at least two variable capacity modes of operation, the at least two variable capacity modes of operation including modes combining variable valve lift per cylinder and modes defining cylinder deactivation;
   prioritizing the at least two variable capacity modes based on fuel efficiency by ranking the at least two variable capacity modes from a mode having a lowest predicted fuel flow to a mode having a highest predicted fuel flow;
   applying torque constraint data and noise and vibration (NV) constraint data to the prioritized variable capacity modes; and
   conducting a mode determination arbitration for the prioritized variable capacity modes having the torque constraint and the vibration constraint data applied to select the mode with the lowest predicted fuel flow allowed by the torque constraint data and the NV constraint data.

2. The control method for selecting an optimal multiple step operating mode for a motor vehicle engine system of claim 1, wherein the at least two variable capacity modes include a first mode defining a full torque capacity (FTC) mode having all cylinders operating at high lift, a second mode defining a first reduced capacity economy mode (RCE1) having all cylinders operating at low lift, and a third mode defining a second reduced capacity economy mode (RCE2) having fewer than all of the cylinders operating.

3. The control method for selecting an optimal multiple step operating mode for a motor vehicle engine system of claim 2, including:
   evaluating a first engine speed (rpm) signal and a first desired torque signal in conjunction with full torque capacity data in a first FTC lookup table;
   analyzing a second engine speed (rpm) signal and a second desired torque signal in conjunction with first reduced capacity economy data in a second RCE1 lookup table; and
   assessing a third engine speed (rpm) signal and a third desired torque signal in conjunction with second reduced capacity economy data in a third RCE2 lookup table.

4. The control method for selecting an optimal multiple step operating mode for a motor vehicle engine system of claim 3, including generating each of a predicted FTC fuel flow signal, a predicted RCE1 fuel flow signal, and a predicted RCE2 fuel flow signal.

5. The control method for selecting an optimal multiple step operating mode for a motor vehicle engine system of claim 4, wherein ranking the at least two variable capacity modes includes sorting in a sorting module the predicted FTC fuel flow signal, the predicted RCE1 fuel flow signal, and the predicted RCE2 fuel flow signal between a lowest predicted fuel flow, a next or second lowest predicted fuel flow, and a highest predicted fuel flow.

6. The control method for selecting an optimal multiple step operating mode for a motor vehicle engine system of claim 5, including forwarding the lowest predicted fuel flow, the second lowest predicted fuel flow, and the highest predicted fuel flow to each of an allowable mode evaluator and an arbitration module.

7. The control method for selecting an optimal multiple step operating mode for a motor vehicle engine system of claim 6, including determining if FTC mode is allowed or not allowed, if RCE1 mode is allowed or not allowed, and if RCE2 mode is allowed or not allowed.

8. The control method for selecting an optimal multiple step operating mode for a motor vehicle engine system of claim 7, including prior to the conducting step transmitting the mode that is ranked having the lowest fuel consumption that is allowed from the allowable mode evaluator to each of an arbitration module and a mode determination module.

9. The control method for selecting an optimal multiple step operating mode for a motor vehicle engine system of claim 3, wherein an engine speed represented by the first engine speed (rpm) signal and an engine speed represented by the second engine speed (rpm) signal are substantially the same, and wherein the engine speed represented by the third engine speed (rpm) signal is greater than the first and the second engine speed signals due to torque converter slip.

10. The control method for selecting an optimal multiple step operating mode for a motor vehicle engine system of claim 1, wherein the applying step includes incorporating boost by calculating a maximum torque capacity for each of the modes that is a function of a current boost pressure.

11. The control method for selecting an optimal multiple step operating mode for a motor vehicle engine system of claim 1, wherein the at least two variable capacity modes include a first mode having a highest torque capacity with a lowest fuel efficiency, a second mode having a medium torque capacity less than the highest torque capacity and with a medium fuel efficiency higher than the lowest fuel efficiency, and a third mode having a lowest torque capacity lower than the medium torque capacity and with a highest fuel efficiency higher than the medium fuel efficiency.

12. The control method for selecting an optimal multiple step operating mode for a motor vehicle engine system of claim 1, wherein the at least two variable capacity modes include a first mode, a second mode, a third mode, and a fourth mode, wherein the first mode includes a highest lift, the second mode includes a high lift having a lift lower than the highest lift, the third mode includes a medium a lift lower than the high lift, and the fourth mode includes a low lift lower than the medium lift.

13. A control method for selecting an optimal multiple step operating mode for a multiple cylinder motor vehicle engine system having variable lift, comprising:
   prioritizing each of a full torque capacity (FTC) mode having all cylinders operating at high lift, a first reduced capacity economy mode (RCE1) having all cylinders operating at low lift, and a second reduced capacity economy mode (RCE2) having fewer than all of the cylinders operating at low lift with at least one cylinder deactivated based on predicted fuel economy of each of the modes;
   sorting the prioritized modes between mode having a lowest predicted fuel flow, a mode having a next or second lowest predicted fuel flow, and a mode having a highest predicted fuel flow;
   applying multiple constraints to each of the prioritized modes including incorporating boost as one of the constraints by calculating a maximum torque capacity for each of the modes that is a function of a current boost pressure; and
   conducting a mode determination arbitration to identify if a change in mode is required.

14. The control method for selecting an optimal multiple step operating mode for a multiple cylinder motor vehicle engine system having variable lift of claim 13, including determining the current boost pressure by measuring a total throttle inlet air pressure (TIAP) indicative of the current boost pressure.

15. The control method for selecting an optimal multiple step operating mode for a multiple cylinder motor vehicle engine system having variable lift of claim 14, including:
entering each of a torque request and a filtered torque request; and
applying an offset to the maximum torque capacity for each of the modes.

16. The control method for selecting an optimal multiple step operating mode for a multiple cylinder motor vehicle engine system having variable lift of claim 15, including comparing the filtered torque request to the maximum torque capacity plus the offset during the conducting step.

17. The control method for selecting an optimal multiple step operating mode for a multiple cylinder motor vehicle engine system having variable lift of claim 15, wherein the offset of one of the maximum torque capacities defines a slow exit threshold.

18. The control method for selecting an optimal multiple step operating mode for a multiple cylinder motor vehicle engine system having variable lift of claim 17, wherein when the filtered torque request exceeds the maximum torque capacity of the slow exit threshold a mode change is directed.

19. The control method for selecting an optimal multiple step operating mode for a multiple cylinder motor vehicle engine system having variable lift of claim 17, wherein the offset of another one of the maximum torque capacities defines a fast exit threshold, wherein when the torque request exceeds the maximum torque capacity of the fast exit threshold a mode change is directed.

20. A control method for selecting an optimal multiple step operating mode for a multiple cylinder motor vehicle engine system having variable lift, comprising:
prioritizing each of a full torque capacity (FTC) mode having all cylinders operating at high lift, a first reduced capacity economy mode (RCE1) having all cylinders operating at low lift, and a second reduced capacity economy mode (RCE2) having fewer than all of the cylinders operating at low lift with at least one cylinder deactivated based on predicted fuel economy of each of the modes;
sorting the prioritized modes between mode having a lowest predicted fuel flow, a mode having a next or second lowest predicted fuel flow, and a mode having a highest predicted fuel flow;
applying multiple constraints to each of the prioritized modes including incorporating boost as one of the constraints by calculating a maximum torque capacity for each of the modes that is a function of a current boost pressure;
adding each of a slow exit offset and a fast exit offset to the maximum torque capacity for each of the modes; and
conducting a mode determination arbitration to identify if a change in mode is required when either the slow exit offset or the fast exit offset is exceeded.

* * * * *